Patented Feb. 24, 1948

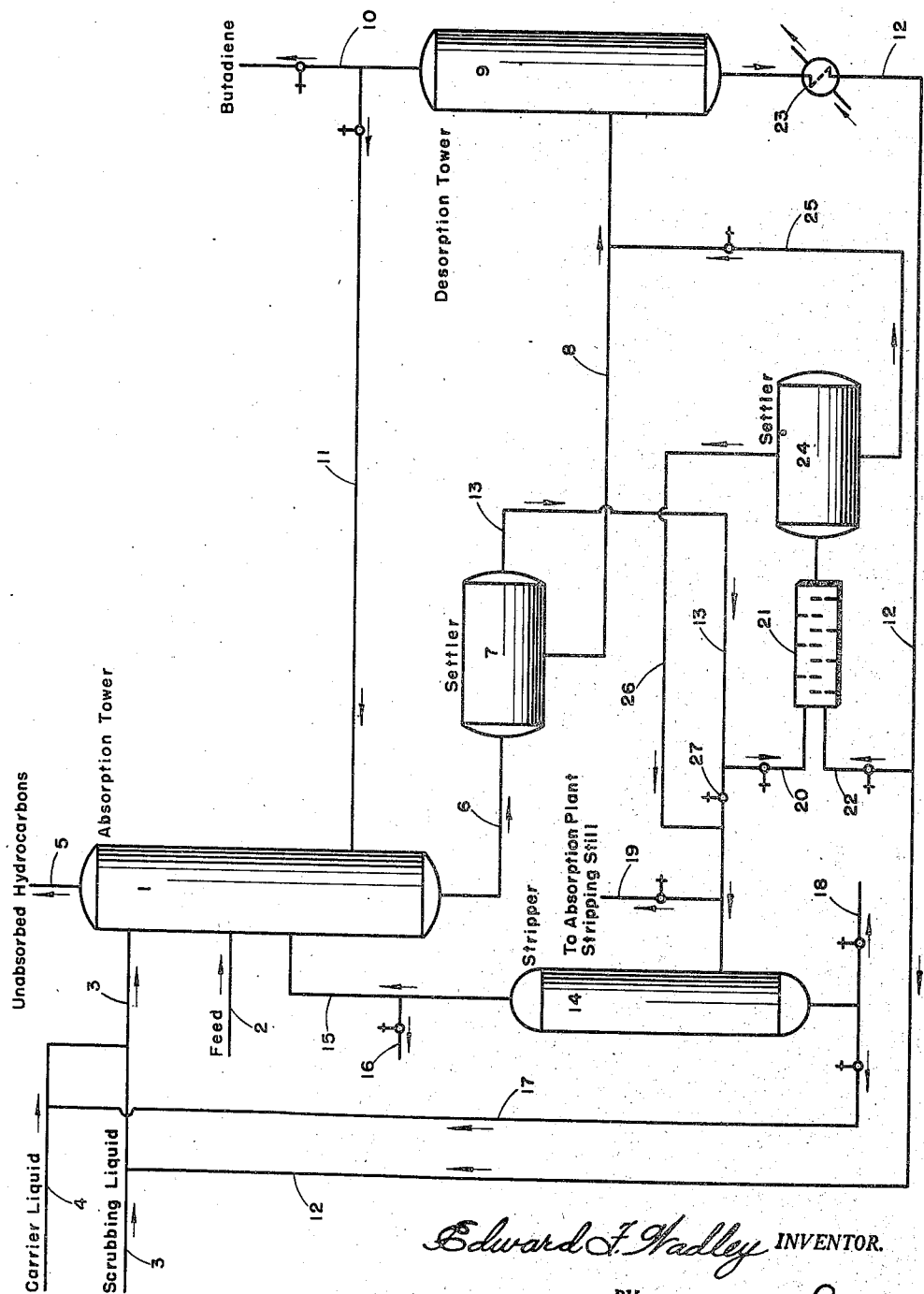

2,436,472

UNITED STATES PATENT OFFICE

2,436,472
VAPOR PHASE SOLVENT EXTRACTION PROCESS

Edward F. Wadley, Baytown, Tex., assignor, by mesne assignments, to Standard Oil Development Company, Elizabeth, N. J., a corporation of Delaware Application May 13, 1946, Serial No. 669,347

6 Claims. (Cl. 260—681.5)

The present application is a continuation-in-part of my copending application Serial No. 547,593, filed August 1, 1944, which has become abandoned.

The present invention is directed to a process in which a mixture of gaseous or vaporous constituents is scrubbed with a liquid capable of taking up one or more of said constituents. A particular process of this general type to which the present invention is especially applicable is the recovery of butadiene from a mixture of $C_4$ hydrocarbons containing it by scrubbing the mixture with an ammoniacal solution of cuprous acetate.

It has already been proposed to improve the efficiency of a scrubbing operation of the aforesaid type by adding to the scrubbing liquid a small amount of another liquid chemically inert to the scrubbing liquid and the gaseous constituents being treated but having high solvent power for such constituents. According to this proposal the amount of added liquid employed is considerably less than 1% because this liquid passes with the scrubbing liquid to a desorption zone wherein the absorbed constituents in the added liquid are removed, together with those from the scrubbing liquid, as a result of which the maintenance of the desired selectivity imposes a restriction on the amount of added liquid which may be employed.

According to the present invention the efficiency of a scrubbing operation of the aforesaid type is made more nearly comparable to that of a liquid phase operation by increasing the amount of added liquid employed and interposing a separation step between the absorption and desorption steps. Since this added liquid serves the function of a carrier, it will be referred to hereinafter, for ease of discussion, as a carrier liquid. For the practice of the present invention, the carrier liquid must be immiscible with the scrubbing liquid.

According to the present invention the carrier liquid is preferably used in amounts ranging from about 3 to 5% by volume of the scrubbing medium. Larger amounts, say up to 20%, may be employed, with, however, a corresponding loss in selectivity. It is possible according to the present invention to operate in stages using a large amount of carrier liquid in the first absorption stage and subjecting the gaseous mixture obtained by desorption of the carrier liquid to a second absorption stage in which from 3 to 5% of carrier liquid is employed. Alternatively, when amounts of carrier liquid up to 20% are employed in the scrubbing stage, the carrier liquid, after being separated from the scrubbing medium, can then be thoroughly mixed with an amount of fresh scrubbing medium followed by a second separation, the second batch of scrubbing liquid being passed to a desorption zone along with the main batch of scrubbing liquid.

The nature of the carrier liquid will depend upon the mixture of the gaseous or vaporous constituents to be treated, as well as upon the scrubbing medium. In the particular process recited above, naphtha having a boiling range from about 350° to 450° F. constitutes a satisfactory carrier liquid. However, other liquids such as kerosene and light gas oil, having suitable boiling point and chemical inertness to the gaseous constituents being treated and sufficient solvent power for said gaseous constituents may be employed as the carrier liquid.

While an ammoniacal solution of cuprous acetate has been specifically mentioned as a scrubbing liquid, other liquids which will absorb as by chemical action and desorb by the application of heat, as for example water, ammoniacal water, and aqueous solutions of silver nitrate, mercuric cyanide, and cuprous chloride, may also be used for this purpose.

The present invention may be more clearly understood from the following detailed description of the accompanying drawing in which the single figure is a front elevation in diagrammatic form of a type of plant suitable for practice of the present invention.

Referring to the drawing in detail, numeral 1 designates a scrubbing or extraction tower to an intermediate point of which the gaseous or vaporous mixture to be scrubbed or extracted is introduced through line 2. The scrubbing liquid is injected near the top of the tower through line 3. Line 3 is provided with a branch line 4 which feeds carrier liquid into the scrubbing liquid line. The scrubbed gaseous or vaporous mixture leaves the top of tower 1 through line 5 while the extract leaves the bottom of the tower through line 6. It will be understood that this tower is provided with interior equipment, such as discs and doughnuts, bubble caps and trays, or packing, such as Raschig rings, to insure sufficient contact between the gases to be scrubbed and the scrubbing medium.

The extract is discharged from line 6 into a settler 7 in which two liquid layers are formed, the one being scrubbing medium carrying absorbed constituents and the other being carrier liquid carrying absorbed constituents. The positions of the layers will depend upon their respective specific gravity. In the particular operation heretofore referred to in which C₄ hydrocarbons containing butadiene are scrubbed with an aqueous medium and naphtha is used as a carrier, the scrubbing liquid forms the lower layer in settler 7 from which it is drawn off by line 8 and discharged into a desorber 9 in which it is heated to drive off its absorbed constituents which leave the desorber 9 through line 10. Some of these absorbed constituents may be returned to the lower portion of tower 1 by line 11. The scrubbing medium is drawn off from the bottom of desorber 9 by line 12 and returned to feed line 3.

The carrier liquid leaves the settler 7 through line 13 and is discharged into a stripper or desorber 14 where it is subjected to the same treatment as that applied to the scrubbing liquid in the desorber 9. The absorbed constituents liberated from the carrier liquid in stripper 14 may be conducted by line 15 to a point in the tower 1 below the feed line 2. Alternatively, they may be discharged from the system or fed to a different system by way of outlet 16.

The stripped carrier liquid is drawn off from the bottom of stripper 14 by line 17 which conducts it back to feed line 4. Since, in some processes, the carrier liquid picks up constituents which are not desirable in the system, acetylene polymers in the C₄ hydrocarbon fractions heretofore mentioned, it may be desirable from time to time to remove part of the carrier liquid from the system by way of line 18.

Instead of subjecting the carrier medium to stripping in the manner shown, it may be taken out of the system by way of line 19 and fed to the stripping still of the main absorption plant ordinarily utilized for segregation of the C₄ hydrocarbons from other refinery gases.

In the operation thus far described, it is preferable to limit the amount of carrier liquid employed to from 3 to 5% by volume of the scrubbing liquid. As previously explained, however, larger amounts of carrier liquid may be employed. In this case it is proposed to remove the C₄ hydrocarbons recovered from stripper 14 from the system illustrated and pass them through an identical system in which from 3 to 5% of carrier liquid is employed.

Alternatively, when a relatively large amount of carrier liquid is employed, for example about 20% by volume of the scrubbing liquid, the carrier liquid containing absorbed constituents may be discharged from line 13 through a branch line 20 into an incorporator 21 to which is also fed a portion of the desorbed scrubbing medium from line 12 by a branch line 22. In this connection it will be advisable to cool the desorbed scrubbing medium in a cooler 23 to a temperature suitable for absorbtion of the desired constituents. In the incorporator 21 the desorbed scrubbing medium and the fat carrier liquid are thoroughly intermixed and discharged into a second settler 24. The scrubbing medium withdrawn from the bottom of this settler 24 is fed by way of line 25 back to line 8, while the carrier liquid is discharged from the upper part of the settler through line 26 back to line 13 behind a valve 27 which is closed when this operation is practiced. In this embodiment the overhead from stripper 14 may be discharged from the system through line 16.

The nature and objects of the present invention having been thus described and illustrated, what is claimed as new and useful and is desired to be secured by Letters Patent is:

1. In a process in which a mixture of gaseous hydrocarbon constituents is scrubbed with an aqueous metallic salt solution which is liquid and capable of selectively absorbing at least one of said constituents, the steps of adding to the scrubbing liquid at least 3% by volume thereof of a hydrocarbon carrier liquid chemically inert to and immiscible with the scrubbing liquid and chemically inert to the gaseous constituents undergoing treatment but having strong solvent power for said gaseous constituents, separating the scrubbing liquid containing absorbed constituents from the carrier liquid containing dissolved constituents and separately recovering absorbed and dissolved hydrocarbon constituents from said liquids.

2. A process for recovering butadiene from a mixture of gaseous hydrocarbons containing it which comprises scrubbing said gaseous mixture with an aqueous metallic salt solution which is liquid and capable of selectively absorbing said butadiene, admixed with at least 3% by volume of a hydrocarbon carrier liquid chemically inert to the scrubbing liquid and immiscible therewith and chemically inert to the gaseous mixture undergoing treatment and having strong solvent power for the constituents of said gaseous mixture, separating the scrubbing liquid containing absorbed butadiene from the carrier liquid containing dissolved constituents and separately recovering absorbed and dissolved butadiene from said liquids.

3. A process according to claim 2 in which the carrier liquid is used in an amount between about 5% and 20% by volume of the scrubbing liquid and, after separation from the scrubbing liquid containing absorbed constituents, the carrier liquid is admixed with fresh scrubbing liquid, the mixture separated into layers and the layers separately desorbed.

4. A process according to claim 2 in which the carrier liquid is a naphtha.

5. A process according to claim 2 in which the scrubbing liquid is an ammoniacal solution of cuprous acetate.

6. A method according to claim 2 in which the scrubbing liquid is an ammoniacal solution of cuprous acetate and the carrier liquid is a naphtha.

EDWARD F. WADLEY.

REFERENCES CITED

The following references are of record in the file of this patent:

UNITED STATES PATENTS

| Number | Name | Date |
|---|---|---|
| 2,204,903 | McKittrick | June 18, 1940 |
| 2,365,898 | Morris et al. | Dec. 26, 1944 |
| 2,384,378 | Hooker et al. | Sept. 4, 1945 |